United States Patent [19]

Heinze

[11] 4,355,130
[45] Oct. 19, 1982

[54] POLYALPHAOLEFIN EXTENDED POLYURETHANE SYSTEMS

[75] Inventor: Richard E. Heinze, Mason, Mich.

[73] Assignee: Communications Technology Corporation, Los Angeles, Calif.

[21] Appl. No.: 311,950

[22] Filed: Oct. 16, 1981

Related U.S. Application Data

[63] Continuation of Ser. No. 176,729, Aug. 11, 1980, abandoned.

[51] Int. Cl.$^3$ .............................................. C08K 5/01
[52] U.S. Cl. .............................. 524/491; 264/272.11; 264/272.13; 524/296; 524/314; 525/130
[58] Field of Search ....................... 525/123, 127, 130; 524/490, 491, 296, 314; 264/272.13, 331.19

[56] References Cited

U.S. PATENT DOCUMENTS 3,993,618 11/1976 Muck ................................ 428/423

Primary Examiner—Paul R. Michl

[57] ABSTRACT

A polyalphaolefin extended polyurethane system comprising the reaction product of an isocyanate terminated polyisocyanate with a polyol in the presence of a polyalphaolefin and, optionally, a liquid ester coupling agent, said polyurethane systems being applicable for use as reenterable encapsulants for sealing insulated electrical devices, as hard volume encapsulants and as general polyurethane elastomers.

14 Claims, No Drawings

POLYALPHAOLEFIN EXTENDED POLYURETHANE SYSTEMS

This application is a continuation of application Ser. No. 176,729, filed Aug. 11, 1980, now abandoned.

The invention relates to a polyalphaolefin extended polyurethane which may, for example, be formulated as a nonspewing material for use in reclaiming or sealing electrical devices.

It is well-known in the art to extend polymers such as polyurethanes. The extended material will then be designated for use in a desired area of utility. Typical of such extending agents is mineral oil, such mineral oil extended polyurethanes being disclosed in U.S. Pat. Nos. 3,714,110 and 3,747,037.

It has also been determined that the mineral oil extended polyurethane is useful in the reclamation and protection of insulated electric devices. Such a device may, for example, be underground telephone cables which are exposed to fluid contaminants. These contaminants can seriously impair the electrical and mechanical properties of the device. The protectant material is pumped into the cable to remove water that has penetrated into interior free spaces. The material is pumped at low viscosity to achieve appropriate distribution and then cures in place to a high viscosity. The cured material then acts as a hydrophobic barrier to subsequent water penetration. The material may also be utilized as an encapsulant in sealing sections of cable. In this manner, the material serves to prevent, from the outset, the penetration of fluid contaminants.

A mineral oil extended polyurethane useful for this purpose was disclosed in U.S. Pat. No. 4,008,197. Thus, the patent defined a cured, cross-linked, mineral oil extended polyurethane prepared from specified polyurethanes and specified coupling agents, the latter agents being indicated as necessary to compatibilize the mineral oil with the cross-linking urethane elastomer. Disadvantages of such systems were, however, discovered and described in U.S. Pat. No. 4,168,258. Thus it was alleged that with the earlier mineral oil extended polyurethanes, the mineral oil tended to migrate towards the grease which is frequently present in newer insulated electrical devices. The migration was indicated as causing the formation of an oily film at the grease interface which tended to decrease the reclamation and encapsulant effectiveness. In order to avoid these difficulties, the patent specifically defined a polyurethane-mineral oil-coupling agent formulation relying on the presence of a polydiene moiety in the polyurethane structure. Mineral oil remained as the extending agent, with the stated preference for including some aromatic carbon content therein.

It has been determined, however, that such mineral oil extended systems exhibit certain disadvantages. Primary among these disadvantages is an increased volatility. As a result of this elevated volatility, particularly at the higher temperatures which are frequently encountered, the conformation of the cured polyurethane is compromised thereby reducing the effectiveness of the system as a reclaiming agent or encapsulant.

It is therefore the primary object of this invention to provide an extended polyurethane system which is applicable for a broad range of uses, particularly as a reclaimant and encapsulant for telecommunication cable.

It is another object to provide such a system which eliminates or significantly reduces the disadvantages encountered with the prior art systems.

It is still another object to provide a new extending agent for said systems which likewise improves upon extending agents of the prior art.

It is a further object to provide extended polyurethane formulations which are defined in accordance with specific end use applications.

Various other objects and advantages of this invention will be readily apparent from the following detailed description thereof.

It has now been surprisingly found that by utilizing polyalphaolefins as the extending agent for polyurethanes, the resulting systems are well suited for a number of end use applications including hard volume encapsulants, cable reclamation, tooling materials as for prototype parts and molds, and as general polyurethane elastomers. Thus, such polyalphaolefin extended polyurethanes comprise a specified polyurethane, a specified polyalphaolefin and, where required such as for reclamation and encapsulation, a specified ester coupling agent. The polyalphaolefins are characterized by low viscosity, low volatility, good electrical properties, high flash point, low pour point and absence of cracking or stressing tendencies on polycarbonate connectors. It is particularly in the area of volatility that they provide a significant improvement over aromatic oil and mineral oil extenders.

When used in the area of reclamation and encapsulation, the polyalphaolefin extended polyurethane provides excellent performance characteristics in possessing the low viscosities necessary for initial introduction into the cable, being able to retain such low viscosities for a period of time sufficient to enable it to fill the length of the free spaces in the cable or form a complete encapsulating cover, being able to displace and/or repel fluid contaminants and then cure to form a gel-like urethane structure which neither spews forth nor exudes the polyalphaolefins. The gel structure is of sufficient rigidity to provide an excellent protective barrier, yet can be readily cut and removed if reentry is desired. The polyurethane is noncorrosive to the copper wire and compatible with conventionally used polycarbonate connectors as well as with polymeric materials utilized in cable manufacture. The system is also convenient to handle and apply in the field.

The polyurethane which is used in the polyalphaolefin extended polyurethane of the present invention is generally prepared by reacting approximately stoichiometric amounts of a polyisocyanate with a polyol. In a preferred embodiment, the polyisocyanate is a polyisocyanate compound which directly reacts with the polyol in the presence of the polyalphaolefin and the coupling agent to form the polyalphaolefin extended polyurethane. In a second embodiment, the polyisocyanate is a polyisocyanate prepolymer which is in turn prepared by reacting an excess of a polyisocyanate compound with a polyol in a manner well known in the art. The polyisocyanate prepolymer is then reacted with the polyol in the presence of the polyalphaolefin and the coupling agent to form the polyalphaolefin extended polyurethane.

The polyisocyanate compound which is reacted with the polyol to form the polyurethane or which is used in the preparation of the polyisocyanate prepolymer may be an aliphatic polyisocyanate, cycloaliphatic polyisocyanate or an aromatic polyisocyanate. Typical of such polyisocyanate compounds are 3-isocyanatomethyl 3,5,5-trimethylcyclohexyl isocyanate (IPDI), toluene diisocyanate (TDI), 4,4'-diphenylmethane diisocyanate (MDI), polymethylene polyphenylisocyanate, 1,5-naphthalene diisocyanate, phenylene diisocyanates, 4,4'-methylene bis-(cyclohexylisocyanate), hexamethylene diisocyanate, biuret of hexamethylene diisocyanate, 2,2,4-trimethylhexamethylene diisocyanate and combinations thereof, as well as related aromatic, aliphatic and cycloaliphatic polyisocyanates which may be substituted with other organic or inorganic groups that do not adversely affect the course of the reaction.

The term "aliphatic", as used herein, includes those carbon chains which are substantially non-aromatic in nature. They may be saturated or unsaturated, unbranched, branched or cyclic in configuration and may contain substituent which do not adversely affect migration. Exemplary of the liquid long chain aliphatic polyisocyanates are dodecyl diisocyanate, tridecyl diisocyanate, and the like. Polymethylene polyphenylisocyanate is commercially available from Mobay Chemicals under the trademark Mondur MRS. Methylene diisocyanate is commercially available as a stabilized liquid form from Upjohn under the trademark Isonate 143L or from Mobay under the trademark Mondur CD. Various polyarylene polyisocyanates are commercially available from Upjohn under the trademark PAPI. Isocyanate terminated prepolymers are available from REN Plastics such as Dc-1688-5 based on PAPI 901 and G-900R based on Hylene W (DuPont), a cycloaliphatic isocyanate.

The polyol which is reacted with the polyisocyanate compound and the polyol which is reacted with the prepolymer is selected from the group consisting of castor oil, polyether polyols, hydroxyl bearing homopolymers of dienes, hydroxyl bearing copolymers of dienes, amine-based polyols, polymeric polyols, and combinations thereof.

The castor oil which may be used in the preparation of the polyalphaolefin extended polyurethane is primarily composed of ricinolein which is a glyceride of ricinoleic acid. A typical castor oil comprises a mixture of about 70% pure glyceryl triricinoleate and about 30% glyceryl diricinoleate-monooleate or monolinoleate and is available from NL Industries as DB Oil. Ricinoleate-based polyols are also available from Spencer-Kellogg as DI Castor Oil.

Suitable polyether polyols include aliphatic alkylene glycol polymers having an alkylene unit composed of at least 3 carbon atoms. These aliphatic alkylene glycol polymers are exemplified by polyoxypropylene glycol and polytetramethylene ether glycol. Also, trifunctional compounds exemplified by the reaction product of trimethylol propane and propylene oxide may be employed. A typical polyether polyol is available from Union Carbide under the designation PPG-425.

The hydroxyl bearing homopolymers of dienes or hydroxyl bearing copolymers of dienes are prepared from dienes which include unsubstituted, 2-substituted or 2,3-disubstituted 1,3-dienes of up to about 12 carbon atoms. Preferably, the diene has up to about 6 carbon atoms and the substituents in the 2- and/or 3-position may be hydrogen, alkyl, generally lower alkyl, e.g., of about 1 to about 4 carbon atoms, substituted aryl, unsubstituted aryl, halogen and the like. Typical of such dienes are 1,3-butadiene, isoprene, chloroprene, 2-cyano-1,3-butadiene, 2,3-dimethyl-1,3-butadiene, and the like. The preferred dienes are 1,3-butadiene and isoprene. A hydroxyl terminated polybutadiene is available from Arco Chemicals under the designation Poly BD R-45 HT.

A wide variety of aromatic and aliphatic diamines may form part of the amine-based polyols, such as N,N-bis(2-hydroxypropyl)aniline and N,N,N'-tetrakis (2-hydroxypropyl)ethylenediamine. A typical amine-based polyol is available from Upjohn under the designation ISONOL 100, while a typical aliphatic amine-based polyol is available from BASF under the designation QUADROL.

Polymeric polyols can be described as conventional polyols with a stable dispersion of vinyl polymers. For example, U.S. Pat. No. 4,104,236 discloses such polyols with acrylonitrile-styrene polymer. A further typical polyol is available from Union Carbide under the designation NIAX 24-32.

The polyalphaolefins, as defined herein, are produced by polymerizing decene-1 to produce trimers, tetramers and pentamers. These are then hydrogenated to eliminate the olefin bond, thereby producing totally saturated hydrocarbons with the generalized formula $C_nH_{2n+2}$ wherein n is predominantly 30, 40 and 50. The fluids are characterized by low viscosity and low volatility. They are non-polar and thus totally not compatible by themselves with the polar urethane compounds. They can, however, be incorporated in systems containing materials with both polar and non-polar components on the same molecule. Commercial polyalphaolefins are available from Bray Oil Co. under the designation PAOL.

As noted hereinabove, in order to totally compatibilize the polyalphaolefin with the polyurethane, an ester coupling agent must be used in forming the extended polyurethanes of the instant invention. However, where the need for total compatibility is not present, such esters may be eliminated. For example, the instant polyurethanes are readily applicable for use as tooling compounds in the preparation of prototype parts and molds without the presence of such esters. Thus, the modest migration of fluid to the surface of the cured part is beneficial inasmuch as it reduces adhesion to the mold. Where used, the coupling agent is non-reactive or substantially non-reactive with the polyurethane forming reactants. Its presence prevents spewing forth of the polyalphaolefin. The applicable esters may be saturated or unsaturated and may be aliphatic, cycloaliphatic, or aromaticaliphatic. Typical esters include phthalates such as diundecylphthalate, diisodecylphthalate, 2-ethylhexyl phthalate and mixtures of n-$C_9$, $C_{10}$ and $C_{11}$ phthalates, adipates such as diisodecyladipate and n-octyl-n-decyl adipate; gluterates; fumarates; sebacates, citrates and the like, as well as polymeric esters such as Plastolein 9720 from Emery Industries.

The polyalphaolefin extended polyurethane of the instant invention is generally comprised of 8–99 parts, by weight, of polyurethane, 1–40 parts by weight, of polyalphaolefin and 0–50 parts, weight, of ester coupling agent. The preferred concentrations with particular reference to the reclaiming and encapsulating utility comprise 8–76 parts, by weight, polyurethane, 10–30 parts, by weight, polyalphaolefin and 6–48 parts, by weight, of ester coupling agent.

Minor amounts of mineral oil may also be present in the extended polyurethane in order to assist in preventing the spewing out of the polyalphaolefin. Such mineral oils include aliphatic, cycloaliphatic, branched aliphatic and aromatic hydrocarbons which are distilled from petroleum. The maximum amount of mineral oil applicable for inclusion is about 20 parts, by weight, and preferably about 15 parts by weight.

The instant polyalphaolefin extended materials are preferably prepared at the application site by admixing the resin system with the hardener system. Depending on the desired utility, the resin and hardener are utilized in amounts meeting the stoichiometric requirements. The resin component comprises the polyisocyanate or polyurethane prepolymer and the ester coupling agent, if present. The hardener component comprises the polyol, a second portion of the same or different ester coupling agent and the polyalphaolefin. Mineral oil, when present, may be added to either component. The catalyst and optional additives such as fungicides, pigments, anti-oxidants, moisture scavengers, and the like, will generally be added to the hardener component. Catalysts are known to those skilled in the art and may comprise, for example, heavy metals utilized in amounts of about 0.1% metal, by weight of hardener component. Upon mixing the components, stable gels will form generally within about thirty minutes at room temperature.

As noted, the polyolphaolefin extended polyurethanes possess the desired properties for a range of utilities, with primary emphasis on utilities such as reenterable encapsulants and reclamants for insulated electrical devices. Thus, they are initially sufficiently fluid to be introduced into the core of the cable or a mold surrounding the area of concern and retain their fluidity for a period of time sufficient to fill all the interior free spaces. In its reclaiming function, the polyurethane will thus displace the liquid penetrants in the free spaces. Thereafter, a stable gel forms within a reasonable period of time to provide a seal against penetration of water or other fluid materials. Where reenterability is desired, the selected polyurethane provides a gel which is sufficiently soft so as to be readily removed. The presence of the polyalphaolefin minimizes volatility thereby providing increased stability of conformation to the resulting gel. The gelled systems have excellent electrical properties, particularly good insulating properties as a result of low dielectric constant and high volume resistivity. Furthermore, there is no exudation of extender and excellent compatibility with materials employed in the cable construction and with polycarbonate connectors.

In addition, the instant extended polyurethanes can be utilized as hard volume (permanent) encapsulants, as tooling compounds for prototype parts and molds, and for general polyurethane elastomeric uses.

The following examples illustrate the preferred embodiments of the invention. In these examples, all parts given are by weight unless otherwise specified.

EXAMPLE 1

This example illustrates the preparation of a typical polyalphaolefin extended polyurethane system of this invention which is intended for use as a reenterable encapsulant.

| 1# | |
|---|---|
| | Resin (parts) — (A) |
| 35 | polymethylene polyphenylisocyanate (1) |
| 65 | diisodecylphthalate |
| | Hardener (parts) — (M) |
| 35.0 | hydroxyl terminated polybutadiene (2) |
| 1.5 | dipropylene glycol |
| 24.0 | polyalphaolefin (3) |
| 39.5 | diisodecyladipate |

(1) MONDUR MRS from Mobay Chemicals
(2) POLY-BD R45 HT from Arco Chemicals
(3) PAOL 60 from Bray Oil A mix of 20.5 parts resin, 100 parts hardener and 0.1% metallic catalyst was prepared which formed a stable, firm gel after about 30 minutes at room temperature. The initial mix exhibited a pour point at less than $-12°$ C. with a hardener viscosity af less than 1500 centipoises at 40° C. The gel also had an insulation resistance of $1 \times 10^{14}$ ohms and a dielectric constant under 4.2 at 100 $H_z$. These characteristics clearly indicated the ready applicability of this system as a reenterable encapsulant.

EXAMPLE 2

| | parts | | |
|---|---|---|---|
| Additional resin systems: | B | C | D |
| Polymethylene polyphenylisocyanate (1) | 50 | 28 | — |
| Methylenediisocyanate (4) | — | — | 80 |
| Diundecylphthalate | 50 | 72 | 20 |

| | parts | | | | | | | | |
|---|---|---|---|---|---|---|---|---|---|
| Additional hardener systems: | N | O | P | Q | R | S | T | U | V |
| Hydroxyl terminated polybutadiene (2) | 30 | 30 | 60 | 30 | 30.2 | 10 | — | 40 | 30.2 |
| Polyoxypropylene diol (5) | — | 10 | 20 | — | — | — | — | — | — |
| Amine-based polyol (6) | — | — | — | 3 | — | — | — | — | — |
| Dipropylene glycol | — | — | — | — | 1.8 | — | — | — | 1.3 |
| Polymeric polyol (7) | — | — | — | — | — | — | 100 | — | — |
| Polyalphaolefin (8) | 30 | 20 | — | — | — | — | — | 20 | — |
| Polyalphaolefin (3) | — | — | 10 | 22 | 20 | 40 | 10 | — | 20.5 |
| Diundecylphthalate | 40 | 40 | 10 | — | — | 50 | — | 20 | — |
| Diisodecyladipate | — | — | — | 45 | — | — | — | — | — |
| Diisodecylphthalate | — | — | — | — | 34 | — | — | — | 34 |
| Mineral Oil | — | — | — | — | 14 | — | — | 20 | 14 |

(4) ISONATE 143L from Upjohn
(5) P410 from BASF
(6) ISONOL C-100 from Upjohn
NIAX 24-32 from Union Carbide
(8) PAOL 40 from Bray Oil Extended polyurethane systems (catalyst added):

| # | Resin | Hardener | Weight Ratio Resin : Hardener |
|---|-------|----------|------------------------------|
| 2 | B | N | 8.5 : 100 |
| 3 | B | O | 20 : 100 |
| 4 | D | P | 30 : 100 |
| 5 | C | Q | 26.5 : 100 |
| 6 | A | R | 20.5 : 100 |
| 7 | A | S | 3.5 : 100 |
| 8 | D | T | 25 : 110 |
| 9 | B | U | 9 : 100 |
| 10 | A | V | 17.6 : 100 |

Formulations 2, 3, 6, 9, and 10 were identified for use as reenterable encapsulants in view of their stable gel-like configuration, their initial viscosity characteristics and their excellent electrical properties. Formulation 4 was identified for use as a hard volume encapsulant, i.e. non-enterable. Formulation 7 was identified for use in cable reclamation. Formulation 8 was identified for use as a tooling compound, it being observed not to contain the ester coupling agent.

EXAMPLE 3

This example illustrates the improved volatility properties of the instant polyurethane systems.

The following comparison systems reflective of the prior art mineral oil and aromatic oil extended systems were prepared.

| (a) Resin | 28 parts polymethylene polyphenylisocyanate (1) |
| | 72 parts hydrogenated terpene |
| Hardener | 25 parts hydroxyl terminated polybutadiene (2) |
| | 75 parts mineral oil |
| | resin: hardener - 16 : 100 |
| (b) Resin | 50 parts methylenediisocyante (4) |
| | 50 parts diundecylphthalate |
| Hardener | 27.5 parts hydroxyl terminated polybutadiene (2) |
| | 7.5 parts polyoxypropylene diol (5) |
| | 40.0 parts diundecylphthalate |
| | 25.0 parts mineral oil |
| | resin; hardener - 25 : 100 |
| (c) Resin | 50 parts polymethylene polyphenylisocyanate (1) |
| | 50 parts diundecylphthalate |
| Hardener | 40 parts hydroxyl terminated polybutadiene (2) |
| | 20 parts diundecylphthalate |
| | 40 parts mineral oil |
| | resin: hardener - 9 : 100 |

Gel samples (catalyst added), ⅜"×1"×3" in size, were prepared from the representative polyurethanes and placed in an air circulating oven for a period of 21 days at 107° C. The samples were weighed before and after the dry heat aging and percentage weight loss calculated.

| System | % weight loss |
|--------|---------------|
| 3 | 2.46 |
| 5 | 4.49 |
| 9 | 12.60 |
| 10 | 14.75 |
| a | 57.00 |
| b | 20.70 |
| c | 22.00 |

It is thus seen that the polyalphaolefin extended polyurethanes of the instant invention exhibit significantly improved volatility characteristics, the latter being an important consideration in selecting outstanding reclamation and encapsulant systems.

In summary, this invention provides novel polyalphaolefin extended polyurethane systems. Variations may be made in procedures, proportions and materials without departing from the scope of the invention as defined by the following claims.

What is claimed is:

1. A polyalphaolefin extended polyurethane system consisting essentially of the low viscosity liquid reaction product of an isocyanate terminated polyisocyanate with a polyol in the presence of a low viscosity liquid polyalphaolephin homopolymer of decene-1 and optionally, an ester coupling agent, the polyisocyanate-polyol reaction product being present in a range of from bout 8-99 parts by weight, said polyalphaolefin in a range of from about 1-40 parts by weight and said ester in a range of from 0-50 parts by weight.

2. The system of claim 1, wherein said polyisocyanate is selected from the group consisting of aliphatic, cycloaliphatic and aromatic polyisocyanates.

3. The system of claim 1, wherein said polyisocyanate is a polyisocyanate prepolymer prepared by reacting an excess of a polyisocyanate compound and a polyol.

4. The system of claim 2, wherein said polyisocyanate is polymethylene polyphenylisocyanate or methylenediisocyanate.

5. The system of claim 1, wherein said polyol is selected from the group consisting of castor oil, polyether polyols, hydroxyl-bearing homopolymers of dienes, hydroxyl-bearing copolymers of dienes, amine-based polyols, polymeric polyols and mixtures thereof.

6. The system of claim 5, wherein said polyol is a hydroxyl terminated polybutadiene.

7. The system of claim 6 which also contains dipropylene glycol.

8. The system of claims 1, 2, 4, 5 or 6 which contains said ester coupling agent, said polyisocyanate polyol reaction product being present in a range of from about 8-76 parts by weight, said polyalphaolefin in a range of from about 10-30 parts by weight and said ester in a range of from about 6-48 parts by weight.

9. The system of claim 8, wherein said ester is selected from the group consisting of phthalates, adipates, gluterates, fumarates, sebacates, citrates, polymeric esters and mixtures thereof.

10. The system of claim 9, wherein said ester is diundecylphthalate, diisodecylphthalate or diisodecyladipate.

11. The system of claim 8, which also contains a maximum of about 20 parts by weight of mineral oil.

12. The system of claim 8 comprising the reaction product of 20.5 parts of a blend of 35 parts of polymethylene polyphenylisocyanate and 65 parts of diisodecylphthalate with 100 parts of a blend of 30.2 parts hydroxyl terminated polybutadiene, 1.8 parts dipropylene glycol, 20 parts polyalphaolefin, 34 parts diisodecylphthalate and 14 parts mineral oil, all parts being by weight.

13. The system of claim 8 comprising the reaction product of 17.6 parts of a blend of 35 parts of polymethylene polyphenylisocyanate and 65 parts of diisodecylphthalate with 100 parts of a blend of 30.2 parts hydroxyl terminated polybutadiene, 1.3 parts dipropylene glycol, 20.5 parts polyalphaolefin, 34 parts of diisodecylphthalate and 14 parts of mineral oil, all parts being by weight.

14. A process for providing a fluid impervious protective seal around insulated electrical devices which comprises introducing the polyurethane system of claim 8 into a confined space surrounding the section of said device to be protected and allowing said system to cure to a gel-like consistency.

* * * * *

UNITED STATES PATENT AND TRADEMARK OFFICE
CERTIFICATE OF CORRECTION

PATENT NO. : 4,355,130
DATED : October 19, 1982
INVENTOR(S) : HEINZE, Richard E.

It is certified that error appears in the above-identified patent and that said Letters Patent are hereby corrected as shown below:

Column 3 Line 29
Dc-1688-5
should be:
DC-1688-5

Column 6
Example 2
NIAX 24-32
should be:
(7) NIAX 24-32

Signed and Sealed this

Twenty-sixth Day of April 1983

[SEAL]

Attest:

GERALD J. MOSSINGHOFF

Attesting Officer

Commissioner of Patents and Trademarks